United States Patent
Okada et al.

(10) Patent No.: US 7,780,452 B2
(45) Date of Patent: Aug. 24, 2010

(54) INDIVIDUAL EXAMINATION EXECUTION DEVICE

(75) Inventors: Kohei Okada, Osaka (JP); Katsuhiro Nakai, Hyogo (JP); Takehisa Hirano, Osaka (JP); Kouji Mukai, Kyoto (JP); Tomoaki Tezuka, Osaka (JP); Daisuke Imoto, Osaka (JP)

(73) Assignee: Panasonic Corporation, Osaka (JP)

( * ) Notice: Subject to any disclaimer, the term of this patent is extended or adjusted under 35 U.S.C. 154(b) by 645 days.

(21) Appl. No.: 11/665,658

(22) PCT Filed: Oct. 17, 2005

(86) PCT No.: PCT/JP2005/019007

§ 371 (c)(1),
(2), (4) Date: Apr. 18, 2007

(87) PCT Pub. No.: WO2006/043493

PCT Pub. Date: Apr. 27, 2006

(65) Prior Publication Data

US 2008/0020366 A1    Jan. 24, 2008

(30) Foreign Application Priority Data

Oct. 19, 2004  (JP)  ............................ 2004-304441
Nov. 2, 2004   (JP)  ............................ 2004-319795

(51) Int. Cl.
G09B 11/00  (2006.01)

(52) U.S. Cl. ..................................... 434/323; 434/350

(58) Field of Classification Search ............. 434/307 R, 434/323, 350, 353
See application file for complete search history.

(56) References Cited

U.S. PATENT DOCUMENTS

| | | | | |
|---|---|---|---|---|
| 4,764,120 A | * | 8/1988 | Griffin et al. | 434/336 |
| 4,820,167 A | * | 4/1989 | Nobles et al. | 434/336 |
| 5,204,813 A | * | 4/1993 | Samph et al. | 434/362 |
| 5,344,326 A | * | 9/1994 | Ferris | 434/336 |
| 6,015,297 A | * | 1/2000 | Liberman | 434/322 |

(Continued)

FOREIGN PATENT DOCUMENTS

JP    2001-215866    8/2001

(Continued)

OTHER PUBLICATIONS

The Asahi Shimbun Morning newspaper, p. 29, Date of Issue: Nov. 6, 2003 along with English translation.

(Continued)

*Primary Examiner*—Kathleen Mosser
(74) *Attorney, Agent, or Firm*—Wenderoth, Lind & Ponack, L.L.P.

(57) ABSTRACT

In a listening comprehension test using individual examination execution devices, according to the present invention, it is possible to avoid a dishonest act such as peeping at another examinee's answers. An individual examination execution device (101) reads examination question data and individual information from an examination question storage means (102) storing the examination questions and an individual information storage means (103) storing the individual information, respectively. Further, the individual examination device selectively generates actual questions according to the individual information read by an actual question generation means (104), and reproduces the actual questions by a reproduction means (105), thereby preventing dishonest acts of respective examinees.

2 Claims, 6 Drawing Sheets

U.S. PATENT DOCUMENTS

| | | | | |
|---|---|---|---|---|
| 6,154,631 | A | * | 11/2000 | Remschel .................. 434/350 |
| 6,181,910 | B1 | * | 1/2001 | Jerrold-Jones et al. ...... 434/353 |
| 2004/0098579 | A1 | | 5/2004 | Nakano et al. |

FOREIGN PATENT DOCUMENTS

| JP | 2002-23610 | 1/2002 |
|---|---|---|
| JP | 2002-149845 | 5/2002 |
| JP | 2002-245184 | 8/2002 |
| JP | 2002-297786 | 10/2002 |
| JP | 2002-314711 | 10/2002 |
| JP | 2003-16199 | 1/2003 |
| JP | 2003-115838 | 4/2003 |
| JP | 2003-255816 | 9/2003 |
| WO | 2005/091248 | 9/2005 |

OTHER PUBLICATIONS

Kenji Yamamura et al., "Multimedia Learning System" Using "On Demand/Variable Speed" Playback of MEPG1 Audio, Matsushita Technical Journal, vol. 44, No. 5, Matsushita Electric Industrial Co., Ltd., Oct. 18, 1998, p. 57, along with Concise Statement of Relevancy.

"Listen Carefully to your Headphone", the Asahi Shimbun Morning newspaper, Nov. 6, 2003, p. 29.

International Search Report issued Jun. 14, 2005 in International Application No. PCT/JP2005/004355.

* cited by examiner

INDIVIDUAL EXAMINATION EXECUTION DEVICE

BACKGROUND OF THE INVENTION

1. Field of Invention

The present invention relates to individual examination execution devices, and more particularly, to those capable of preventing dishonest acts, and reducing mental burdens on examinees.

Further, the present invention relates to individual examination execution devices, and more particularly, to those capable of preventing dishonest acts, and speedily performing notification of the results of examination to the examinees.

2. Description of the Related Art

In a listening comprehension test in the conventional National Center Test for University Admissions, voices are reproduced from speakers placed in an examination room so that examinees in the examination room can listen to the voices concurrently to answer questions. The examinees write answers in computer-scoring answer sheets. However, because of differences in environments of examination rooms, differences in audibility of examinees might occur, such that examinees in some examination room cannot listen to the questions well, leading to lack of equality. So, in order to secure equality in audibility, introduction of a method using individual examination execution devices to which headphones or earphones are connected has been determined.

Although no document to be cited as a prior art relating to this technique has been found, there is a non-patent document as follows, and it becomes a matter of public knowledge (for example, refer to non-patent document 1).

Non-patent document 1: newspaper article, Asahi Shimbun (morning edition) on Nov. 11, 2003, page 29

BRIEF SUMMARY OF THE INVENTION

Since the conventional individual examination execution device is constituted as described above, it is necessary to always consider risks of dishonest acts which might occur in such listening comprehension test. The dishonest acts are roughly divided into an act of peeping at an answer sheet of another examinee, and an act of knowing questions prior to other examinees. The former is caused by that the answer positions on the computer-scored answer sheets are easily found because all the examinees answer the same questions in the same order. Further, the latter is caused by leakage of examination questions, or by examinees, to which question sheets are distributed earlier than others, peeping at the question sheets before start of examination due to time differences in distributing the question sheets to the respective examinees. In order to avoid the dishonest act of peeping at answers of another examinee, there has been proposed a method of inputting answers directly to the individual examination execution device without using the computer-scored answer sheets. In this method, however, the examinee cannot grasp the answer status at a glance, leading to a mental burden on the examinee.

The present invention is made to solve the above-described problems and has for its object to provide an individual examination execution device which can prevent dishonest acts to answers, and reduce mental burden on each examinee, in an examination method using the individual examination execution device.

Further, in the conventional individual examination execution device described above, the risk of information leakage exists from formation of examination questions and answers to distribution thereof during examination. Further, in the above-mentioned method of using the individual examination execution device to which headphones or earphones are connected, dishonest acts such as bringing out a recording medium in which examination questions and answers are previously stored, or copying examination questions and answers that are translated into digitized information, are likely to occur. Furthermore, even when occurrence of a dishonest act such as information leakage is discovered immediately before the start of examination, there is not enough time to change the examination questions or re-prepare the examination question and answer sheets, resulting in postponement or cancellation of the examination, which brings great damages in time and cost to both the examiner and the examinees. Moreover, even in the case of performing the examination of the machine-readable answer sheet system, it takes long time from when the answer sheets are collected to when the results of examination are informed to the examinees.

The present invention is made to solve the above-described problems and has for its object to provide an individual examination execution device which can avoid dishonest acts, and speedily notify the examinees of the results of examination after the end of examination, in an examination method using the individual examination execution device.

An individual examination execution device according to a first aspect of the present invention comprises an examination question storage means which stores examination questions; an individual information storage means which stores individual information of an examinee; an actual question generation means for generating actual questions on the basis of the examination questions that are read from the examination question storage means and individual information that is read from the individual information storage means; and a reproduction means for reproducing the actual questions that are generated by the actual question generation means.

An individual examination execution device according to a second aspect of the present invention comprises an examination question storage means which stores examination questions; a reproduction means for reproducing the examination questions that are read from the examination question storage means; an answer inputting means for inputting answers; an answer storage means which stores the answers inputted to the answer inputting means; an unanswered question confirmation means for confirming information of unanswered questions with reference to an answer data group that is stored in the answer storage means; a display means for displaying information relating to the unanswered questions that are confirmed by the unanswered question confirmation means; and an automatic answering means for automatically answering the unanswered questions that are confirmed by the unanswered question confirmation means, according to a procedure that has previously been specified by the examinee.

An individual examination execution method according to a third aspect of the present invention is a method having an examination question storage means which stores examination questions, and an individual information storage means which stores individual information of an examinee, and performing an individual examination such that each examinee individually reproduces the examination questions stored in the examination question storage means, and this method includes an actual question generation step of generating actual questions on the basis of the examination questions that are read from the examination question storage means, and the individual information that is read from the individual information storage means; and a reproduction step of reproducing the actual questions that are generated in the actual question generation step.

An individual examination execution method according to a fourth aspect of the present invention is a method having an examination question storage means which stores examination questions, a reproduction means for reproducing the examination questions that are read from the examination question storage means, an answer inputting means for inputting answers, and an answer storage means which stores the answers supplied from the answer inputting means, and performing an individual examination such that each examinee individually reproduces the examination questions stored in the examination question storage means, and this method includes an unanswered question confirmation step of confirming information of unanswered questions with reference to an answer data group that is stored in the answer storage means; a display step of displaying information relating to the unanswered questions that are confirmed in the unanswered question confirmation step; and an automatic answering step of automatically answering the unanswered questions that are confirmed by the unanswered question confirmation means, according to a procedure that has previously been specified by the examinee.

An individual examination execution device according to a fifth aspect of the present invention comprises an examination question storage means which stores plural examination questions; an examination question reading permission means for outputting information that permits reading of the examination questions from the examination question storage means, on the basis of a predetermined condition; a question selection means for selecting a predetermined examination question from among the plural examination questions stored in the examination question storage means, on the basis of the information that permits reading of the examination questions, said information being outputted from the examination question reading permission means; and a reproduction means for reproducing the selected examination question.

An individual examination execution device according to a sixth aspect of the present invention is an individual examination execution device as defined in the fifth aspect of the invention, wherein the examination question reading permission means includes a reproduction permission judgment means for judging whether reproduction of questions should be permitted or not, and a recording medium which stores a reproduction permission key that gives a permission of reproduction to the reproduction permission judgment means; and a predetermined examination question is selected from among the plural examination questions stored by the question selection means using the reproduction permission key that is read from the recording medium.

An individual examination execution device according to a seventh aspect of the present invention is a device including an examination question storage means that stores examination questions, and a reproduction means for reproducing the examination questions, which device further includes a play/pause means which can arbitrarily set playback of the examination questions and pause of the playback; and a remaining necessary reproduction time display means for calculating and displaying a period of time that is required for reproducing the remaining examination questions, on the basis of the elapsed time of the reproduction state and the examination execution time, with the reproduction of the examination questions being temporarily stopped when pause is selected.

An individual examination execution device according to an eighth aspect of the present invention is a device including an examination question storage means that stores examination questions, and a reproduction means for reproducing the examination questions, which device further includes a high-speed reproduction command inputting means to which an arbitrary set value higher than 1× speed can be inputted as a reproduction speed for the examination questions; and a high-speed reproduction control means for controlling the reproduction speed of the examination questions, which is higher than 1× speed and is adjusted to the set value that is obtained from the high-speed reproduction command inputting means.

An individual examination execution device according to a ninth aspect of the present invention is a device including an examination question storage means that stores examination questions, and a reproduction means for reproducing the examination questions, which device further includes a high-speed reproduction command inputting means to which an arbitrary set value higher than 1× speed can be inputted as a reproduction speed for the examination questions; a high-speed reproduction control means for controlling the reproduction speed of the examination questions, which is higher than 1× speed and is adjusted to the set value that is obtained from the high-speed reproduction command inputting means; a play/pause means which can arbitrarily set playback of the examination questions and pause of the playback; and a remaining necessary reproduction time display means for calculating and displaying a period of time that is required for reproducing the remaining questions when the remaining questions are reproduced at the reproduction speed of the set value, on the basis of the time that is required for reproducing the remaining questions at 1×-speed, and the set value of the current reproduction speed, with the reproduction of the examination questions being temporarily stopped when pause is selected.

An individual examination execution device according to a tenth aspect of the present invention comprises an examination question storage means which stores examination questions; an audio reproduction means for reproducing audio information included in the examination questions; a display reproduction means for reproducing video information included in the examination questions; an answer inputting means for inputting answers in association with reproduction of the examination questions; an answer storage means for holding the inputted answers; a correct answer storage means which stores correct answers of the examination questions; an answer comparison means for comparing the answers stored in the answer storage means with the correct answers stored in the correct answer storage means to judge whether the answers are correct or wrong; a correct/wrong result notification means for notifying the result of comparison by the answer comparison means; an answer comparison permission judgment means for judging as to whether comparison of answers should be executed or not; and a recording medium which stores an answer permission key that gives permission of answer execution to the answer comparison permission judgment means; wherein comparison of answers is executed by the answer comparison means only when the answer comparison permission judgment means permits execution of answer comparison by the answer permission key that is read from the recording medium.

An individual examination execution method according to an eleventh aspect of the present invention is a method for subjecting each examinee to individual examination according to a predetermined sequence of examination questions that are stored in a device, and this method includes an examination question reading permission step of outputting information that permits reading of examination questions on the basis of a predetermined condition, from an examination question storage means which stores plural examination questions; a question selection step of selecting a predetermined examination question from among the plural questions stored in the examination question storage means, on the basis of the information that permits reading of the examination questions; and a reproduction step of reproducing the selected examination question.

An individual examination execution device according to the first aspect of the present invention comprises an examination question storage means which stores examination questions; an individual information storage means which stores individual information of an examinee; an actual question generation means for generating actual questions on the basis of the examination questions that are read from the examination question storage means and individual information that is read from the individual information storage means; and a reproduction means for reproducing the actual questions that are generated by the actual question generation means. Therefore, examination questions having different sequences of choices and different contents for each individual information are reproduced, thereby preventing a dishonest act of peeping at the answers of another examinee.

Further, an individual examination execution device according to the second aspect of the present invention comprises an examination question storage means which stores examination questions; a reproduction means for reproducing the examination questions that are read from the examination question storage means; an answer inputting means for inputting answers; an answer storage means which stores the answers inputted to the answer inputting means; an unanswered question confirmation means for confirming information of unanswered questions with reference to an answer data group that is stored in the answer storage means; a display means for displaying information relating to the unanswered questions that are confirmed by the unanswered question confirmation means; and an automatic answering means for automatically answering the unanswered questions that are confirmed by the unanswered question confirmation means, according to a procedure that has previously been specified by the examinee. Therefore, also when an examinee inputs answers by using the answer inputting means of the individual examination execution device instead of writing answers into an answer sheet, the examinee can easily confirm the unanswered questions, and thereby the examinee can answer all the questions even when the examination time is running out, as in the conventional computer-scored sheet examination, resulting in an examination that does not cause a mental burden on the examinee. Further, even when the examination time is running out with the unanswered questions being left, the examinee can answer all the questions.

Further, an individual examination execution method according to the third aspect of the present invention is a method having an examination question storage means which stores examination questions, and an individual information storage means which stores individual information of an examinee, and performing an individual examination such that each examinee individually reproduces the examination questions stored in the examination question storage means, and this method includes an actual question generation step of generating actual questions on the basis of the examination questions that are read from the examination question storage means, and the individual information that is read from the individual information storage means; and a reproduction step of reproducing the actual questions that are generated in the actual question generation step. Therefore, examination questions having different sequences of choices and different contents for each individual information are reproduced, thereby preventing a dishonest act of peeping at the answers of another examinee.

Further, an individual examination execution method according to the fourth aspect of the present invention is a method having an examination question storage means which stores examination questions, a reproduction means for reproducing the examination questions that are read from the examination question storage means, an answer inputting means for inputting answers, and an answer storage means which stores the answers supplied from the answer inputting means, and performing an individual examination such that each examinee individually reproduces the examination questions stored in the examination question storage means, and this method includes an unanswered question confirmation step of confirming information of unanswered questions with reference to an answer data group that is stored in the answer storage means; a display step of displaying information relating to the unanswered questions that are confirmed in the unanswered question confirmation step; and an automatic answering step of automatically answering the unanswered questions that are confirmed by the unanswered question confirmation means, according to a procedure that has previously been specified by the examinee. Therefore, also when an examinee inputs answers by using the answer inputting means of the individual examination execution device instead of writing answers into an answer sheet, the examinee can easily confirm the unanswered questions, and thereby the examinee can answer all the questions even when the examination time is running out, as in the conventional computer-scored sheet examination, resulting in an examination that does not cause a mental burden on the examinee. Further, even when the examination time is running out with the unanswered questions being left, the examinee can answer all the questions.

Further, an individual examination execution device according to the fifth aspect of the present invention comprises an examination question storage means which stores plural examination questions; an examination question reading permission means for outputting information that permits reading of the examination questions from the examination question storage means, on the basis of a predetermined condition; a question selection means for selecting a predetermined examination question from among the plural examination questions stored in the examination question storage means, on the basis of the information that permits reading of the examination questions, said information being outputted from the examination question reading permission means; and a reproduction means for reproducing the selected examination question. Therefore, it is possible to prevent a dishonest act due to leakage of information.

Further, according to the sixth aspect of the present invention, in the individual examination execution device defined in the fifth aspect of the invention, the examination question reading permission means includes a reproduction permission judgment means for judging whether reproduction of questions should be permitted or not, and a recording medium which stores a reproduction permission key that gives a permission of reproduction to the reproduction permission judgment means; and a predetermined examination question is selected from among the plural examination questions stored by the question selection means using the reproduction permission key that is read from the recording medium. Therefore, it is possible to prevent the examinee from bringing out only the individual examination execution device and reproducing the examination questions, thereby avoiding dishonest acts.

Further, an individual examination execution device according to the seventh aspect of the present invention is a device including an examination question storage means that stores examination questions, and a reproduction means for reproducing the examination questions, which device further includes a play/pause means which can arbitrarily set playback of the examination questions and pause of the playback; and a remaining necessary reproduction time display means for calculating and displaying a period of time that is required for reproducing the remaining examination questions, on the basis of the elapsed time of the reproduction state and the examination execution time, with the reproduction of the examination questions being temporarily stopped when pause is selected. Therefore, the examinee can freely perform pace allocation for answers to the examination questions within the allowed range of the examination execution time while considering the time required for reproducing the remaining questions.

Further, an individual examination execution device according to the eighth aspect of the present invention is a device including an examination question storage means that stores examination questions, and a reproduction means for reproducing the examination questions, which device further includes a high-speed reproduction command inputting means to which an arbitrary set value higher than 1× speed can be inputted as a reproduction speed for the examination questions; and a high-speed reproduction control means for controlling the reproduction speed of the examination questions, which is higher than 1× speed and is adjusted to the set value that is obtained from the high-speed reproduction command inputting means. Therefore, the examinee can freely perform pace allocation for answers to the examination questions within the allowed range of the examination execution time.

Further, an individual examination execution device according to the ninth aspect of the present invention is a device including an examination question storage means that stores examination questions, and a reproduction means for reproducing the examination questions, which device further includes a high-speed reproduction command inputting means to which an arbitrary set value higher than 1× speed can be inputted as a reproduction speed for the examination questions; a high-speed reproduction control means for controlling the reproduction speed of the examination questions, which is higher than 1× speed and is adjusted to the set value that is obtained from the high-speed reproduction command inputting means; a play/pause means which can arbitrarily set playback of the examination questions and pause of the playback; and a remaining necessary reproduction time display means for calculating and displaying a period of time that is required for reproducing the remaining questions when the remaining questions are reproduced at the reproduction speed of the set value, on the basis of the time that is required for reproducing the remaining questions at 1×-speed, and the set value of the current reproduction speed, with the reproduction of the examination questions being temporarily stopped when pause is selected. Therefore, the examinee can freely perform pace allocation for answers to the examination questions within the allowed range of the examination execution time while considering the time required for reproducing the remaining questions.

Further, an individual examination execution device according to the tenth aspect of the present invention comprises an examination question storage means which stores examination questions; an audio reproduction means for reproducing audio information included in the examination questions; a display reproduction means for reproducing video information included in the examination questions; an answer inputting means for inputting answers in association with reproduction of the examination questions; an answer storage means for holding the inputted answers; a correct answer storage means which stores correct answers of the examination questions; an answer comparison means for comparing the answers stored in the answer storage means with the correct answers stored in the correct answer storage means to judge whether the answers are correct or wrong; a correct/wrong result notification means for notifying the result of comparison by the answer comparison means; an answer comparison permission judgment means for judging as to whether comparison of answers should be executed or not; and a recording medium which stores an answer permission key that gives permission of answer execution to the answer comparison permission judgment means; wherein comparison of answers is executed by the answer comparison means only when the answer comparison permission judgment means permits execution of answer comparison by the answer permission key that is read from the recording medium. Therefore, also listening questions to which the examinee answers while viewing pictures and diagrams can be executed by only the individual examination execution device, and thereby all the papers are dispensed with. As a result, it is possible to reduce the labors of preparing and distributing the question sheets on which visual information such as pictures and diagrams are described, thereby preventing leakage of information due to theft or the like of the question sheets on which pictures and diagrams are described. Further, the time from the end of examination to notification of answers to the examinees can be reduced, and further, such a dishonest act that the examinee performs answer comparison during the examination to know the correct answers can be avoided.

Further, an individual examination execution method according to the eleventh aspect of the present invention is a method for subjecting each examinee to individual examination according to a predetermined sequence of examination questions that are stored in a device, and this method includes an examination question reading permission step of outputting information that permits reading of examination questions on the basis of a predetermined condition, from an examination question storage means which stores plural examination questions; a question selection step of selecting a predetermined examination question from among the plural questions stored in the examination question storage means, on the basis of the information that permits reading of the examination questions; and a reproduction step of reproducing the selected examination question. Therefore, it is possible to avoid dishonest acts due to leakage of information.

DETAILED DESCRIPTION OF THE INVENTION

Embodiment 1

Hereinafter, an individual examination execution device according to a first embodiment of the present invention will be described with reference to the drawings.

Figure 1:
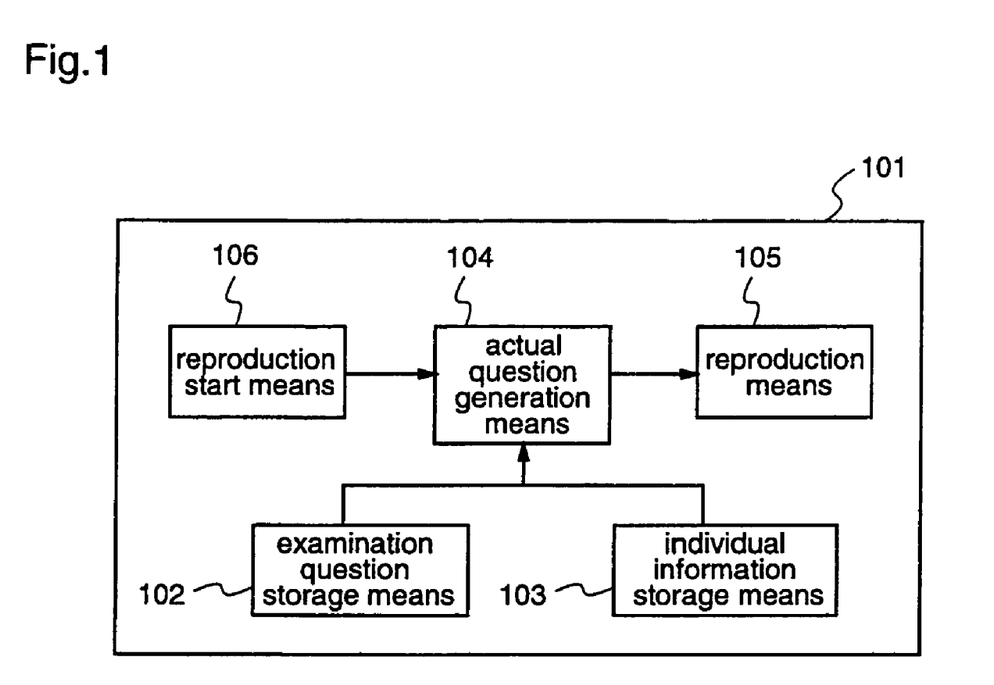
FIG. 1 is a block diagram illustrating the construction of an individual examination execution device according to a first embodiment of the present invention.

FIG. 1 is a block diagram illustrating an individual examination execution device according to the first embodiment.

In FIG. 1, reference numeral 101 denotes an individual examination execution device, 102 denotes an examination question storage means, 103 denotes an individual information storage means, 104 denotes an actual question generation means for selecting and generating actual questions from question data that have previously been stored in the examination question storage means 102, on the basis of the individual information data stored in the individual information storage means 103, 105 denotes a reproduction means, and 106 denotes a reproduction start means.

Hereinafter, an examination method using the individual examination execution device 101 constituted as described above will be described.

When reproduction start is instructed by the reproduction start means 106 of the individual examination execution device 101, the actual question generation means 104 reads the question data stored in the examination question storage means 102 and the individual information data stored in the individual information storage means 103. The question data comprise questions, choices to be correct answers, and choices to be wrong answers, and the individual information data is a numerical sequence that is uniquely determined for each examinee, such as an examinee's number.

In the actual question generation means 104, plural sets of sequences of correct answer choice numbers are previously stored, and the lower 1 to 2 digits of the individual information data are related to the correct answer choice numbers so that the correct answer choice numbers corresponding to the individual information data are selected.

The actual question generation means 104 assigns, among the selected correct answer choice number sequences, the correct answer choice number of the corresponding question to the choice to be the correct answer while assigning the other choice numbers successively to the choices to be wrong answers, thereby generating actual questions. Since the correct answer choice number sequence is uniquely determined for the individual information data, this is utilized when scoring is carried out. The actual questions generated by the actual question generation means 104 are reproduced by the reproduction means 105.

To be specific, when the individual information data are the examinee's numbers, the above-mentioned correct answer choice number sequences that are different from each other are assigned to the respective values of 0~9 at the lower 1 digits of the individual information data, whereby examination questions having the sequences of choices and contents thereof which do not agree with each other among arbitrary examinees can be formed for 10 examinees having adjacent examinee's numbers. Further, when the correct answer choice number sequences which are different from each other are assigned to the respective values of 0~99 at the lower two digits of the individual information data, examination questions having the sequences of choices and contents thereof which do not agree with each other among arbitrary examinees can be formed for 100 examinees having adjacent examinee's numbers.

A semiconductor player is used as the individual examination execution device 101 to reproduce audio, memory cards are used as the examination question storage means 102 and the individual information storage means 103 to store data, and examinee's numbers are used as the individual information data, whereby the device can be easily realized.

As described above, according to the first embodiment, the individual examination execution device 101 is provided with the individual information storage means 103 that stores the information for discriminating the respective examinees, and the actual question generation means 104 that forms examination questions for each examinee, which are different from those of other examinees. Therefore, it is possible to form examination questions having the sequences of choices and contents thereof that do not agree among arbitrary examinees, whereby the answer positions on the computer-scored answer sheets do not agree among the examinees, thereby avoiding dishonest acts such as cheating.

While in this first embodiment a semiconductor player is used as the individual examination execution device 101, the individual examination execution device 101 is not restricted thereto, and any device that can reproduce audio, such as a portable music player or a radio cassette player, may be used.

Further, while in this first embodiment memory cards are used as the examination question storage means 102 and the individual information storage means 103, these means are not restricted to the memory cards, and any media that can store electron data, such as a hard disk or a mini disk, may be adopted.

Furthermore, while in this first embodiment the examinee's numbers are used as the individual information data, the individual information data are not restricted thereto, and any data sequences may be used so long as the data sequences do not match between arbitrary two examinees in the same examination room, with respect to the combinations of the examinees and the individual examination execution devices assigned to the examinees, and for example, the sheet numbers in the examination room or the manufacturing numbers of the individual examination execution devices may be used.

Furthermore, while in this first embodiment the method of storing plural sets of correct answer choice number sequences and selecting one of the sequences according to the individual information data is described as the question generation method of the actual question generation means 104, the method of assigning the individual information data to the correct answer choice number sequences is not restricted thereto, and any method may be adopted so long as it is ensured that the choice numbers to be the correct answers do not match between arbitrary two examinees in the same examination room.

Embodiment 2

Hereinafter, an individual examination execution device according to a second embodiment of the present invention will be described with reference to the drawings.

Figure 2:
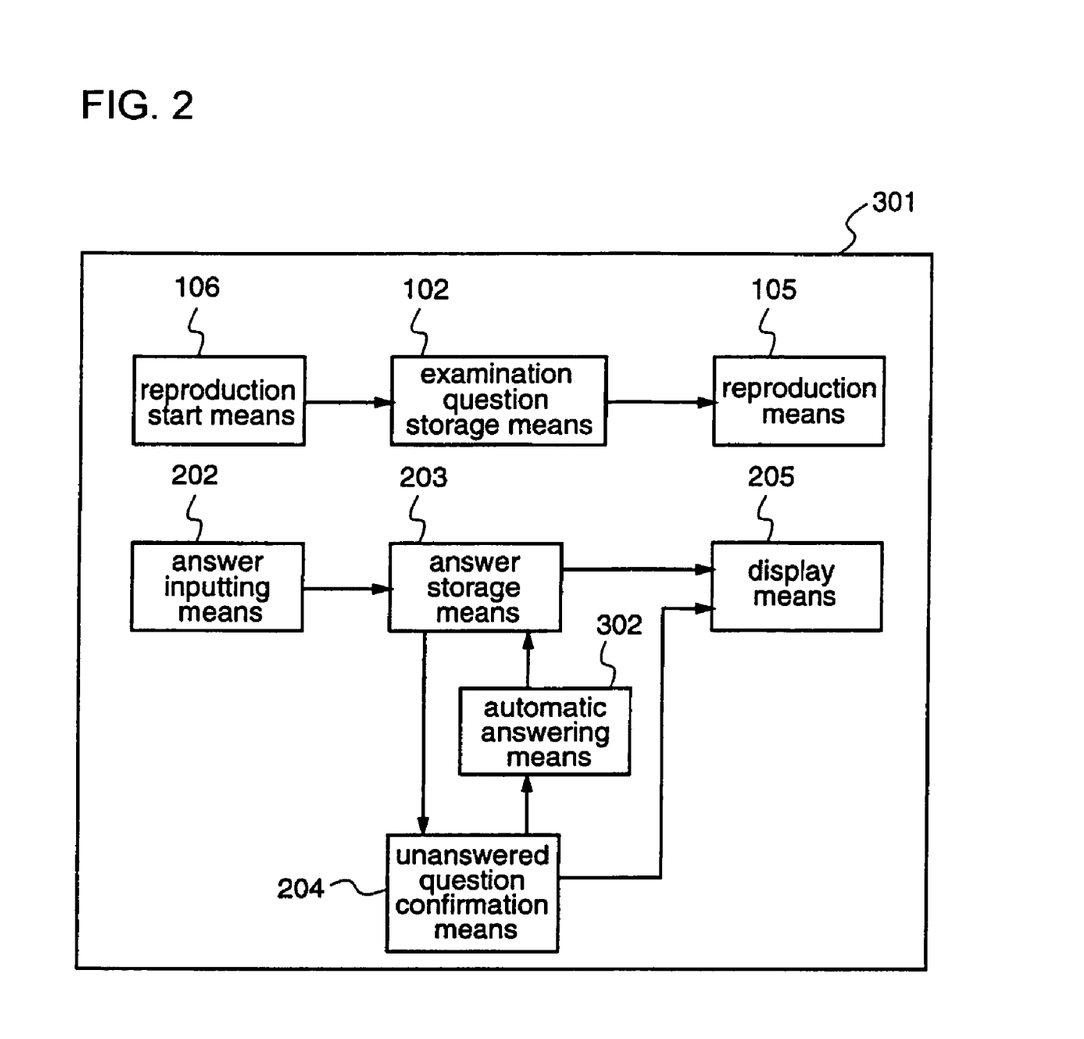
FIG. 2 is a block diagram illustrating the construction of an individual examination execution device according to a second embodiment of the present invention.

FIG. 2 is a diagram illustrating the construction of the individual examination execution device according to the second embodiment.

In FIG. 2, reference numeral 301 denotes an individual examination execution device, 102 denotes an examination question storage means, 203 denotes an answer storage means, 204 denotes an unanswered question confirmation means, 202 denotes an answer inputting means, 302 denotes an automatic answer means, 105 denotes a reproduction means, 205 denotes a display means, and 106 denotes a reproduction start means.

Hereinafter, a description will be given of an examination method using the individual examination execution device that is constructed as described above.

When reproduction start is instructed by the reproduction start means 106 of the individual examination execution device 301, examination question data stored in the examination question storage means 102 are read out. The read examination question data are sent to the reproduction means 105. Further, answers to the examination questions are not written in computer-scored answer sheets but are inputted by the answer inputting means 202 and stored in the answer storage means 203.

Further, the unanswered question confirmation means 204 outputs information that specifies the unanswered questions, e.g., the numbers of the unanswered questions, to the automatic answer means 302 and the display means 205 with reference to the answer data groups that are stored in the answer storage means 203.

Further, the automatic answer means 302 generates answers to the unanswered question groups that are confirmed by the unanswered question confirmation means 204, according to a predetermined method, and stores the answers in the answer storage means 203. For example, the answer sequence generated by the automatic answer means 302 is a sequence comprising specific numbers designated by the examinee.

A semiconductor player is used as the individual examination execution device 301 to reproduce audio, memory cards are used as the examination question storage means 102 and the answer storage means 203 to store data, and a liquid crystal display is used as the display means 205 to display the information of the unanswered questions, whereby the device can be easily realized.

As described above, according to the second embodiment, since the individual examination execution device 301 is provided with the unanswered question confirmation means 204 that indicates the numbers of unanswered questions, and the automatic answer means 302 that designates the answer numbers for the unanswered questions according to the procedure determined by the examinee. Therefore, in the case where the question reproduction device has the answer inputting function, answering to the unanswered questions can be carried out in short time, and thereby the examinee can appropriately enter the answers to the unanswered questions as in the case of using the ordinary computer-scored answer sheets.

While in this second embodiment a semiconductor player is used as the individual examination execution device 301, the individual examination execution device 301 is not restricted thereto, and any device that can reproduce audio, such as a portable music player or a radio cassette player, may be used.

Further, while memory cards are used as the examination question storage means 102 and the answer storage means 203, these means may be implemented by any media in which electron data can be recorded, such as a hard disk or a mini disk.

Further, while a liquid crystal display is used as the display means 205, the display means 205 is not restricted thereto, and any display device such as an organic EL display or a PDP (Plasma Display Panel) may be used.

Further, while in this second embodiment a sequence comprising specific numbers designated by the examinee is described as an answer sequence generated by the automatic answer means 302, the numbers designated by the automatic answer means 302 are not restricted thereto because the automatic answer means 302 is a means for preventing the scores of the unanswered questions from becoming 0 by inputting appropriate answers for the unanswered questions, and other numbers may be used so long as the numbers are approved as answers. For example, a sequence of numbers which are calculated so that the distribution of answers including the already-made answer sequence somewhat approach the center values of the choice number sequences of the respective questions, may be adopted.

Embodiment 3

Hereinafter, an individual examination execution device according to a third embodiment of the present invention will be described.

In the conventional individual examination execution device, when the reproduction permission inputting means held by the examiner is wirelessly connected to the individual examination execution devices held by the respective examinees, there may occur a dishonest act as follows. That is, a malicious examinee prepares a plurality of individual examination execution devices and gives them to a third party in advance, and the third party is present within the reach of radio wave to make contact with the examinee. In this case, since the individual examination execution device held by the third person can perform reproduction simultaneously outside the examination room, the third person can check the questions and inform correct answers to the examinee. The individual examination execution device according to the third embodiment can avoid such a dishonest act that the third person having the conventional individual examination execution device reproduces the questions and informs the correct answers to the examinee, while relaxing the conditions of the examination execution environment and reducing the trouble of the preparation for examination execution.

Figure 3:
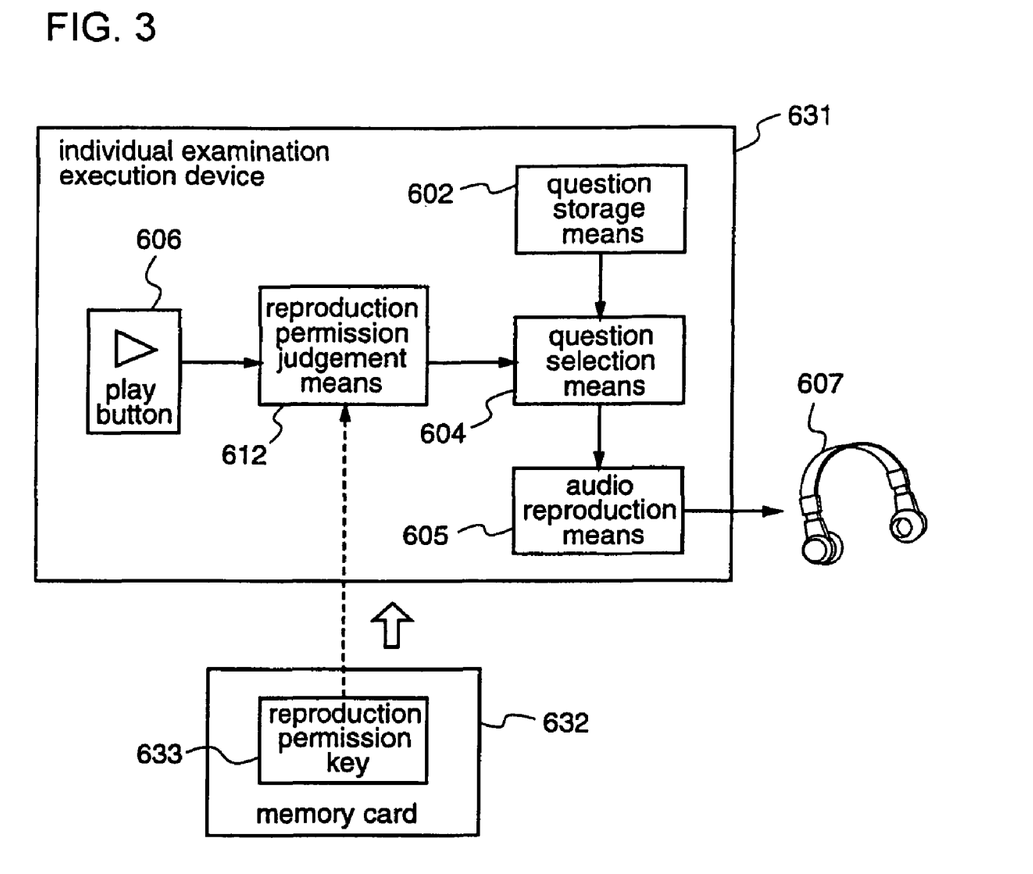
FIG. 3 is a block diagram of an individual examination execution device according to a third embodiment for explaining an examination method using the device.

FIG. 3 is a diagram illustrating the construction of the individual examination execution device according to the third embodiment.

In FIG. 3, reference numeral 631 denotes an individual examination execution device, 602 denotes a question storage means, 612 denotes a reproduction permission judgment means, 632 denotes a memory card, 633 denotes a reproduction permission key, 604 denotes a question selection means, 605 denotes an audio reproduction means, 606 denotes a play button, and 607 denotes headphones.

The question storage means 602 constituting the individual examination execution device 631 stores plural examination questions, the reproduction permission judgment means 612 judges whether reproduction of questions should be permitted or not, when the play button 606 is pressed, the reproduction permission key 633 gives question reproduction permission information to the reproduction permission judgment means 612, the question selection means 604 selects one from among the plural examination questions that are stored in the question storage means 602, and the audio reproduction means 605 outputs the question selected by the question selection means 604 to the headphones 607. An examination question reading permission means is implemented by the reproduction permission judgment means 612, the question selection means 604, and the memory card 632 implement.

Hereinafter, an examination method using the individual examination execution device 631 will be described.

The individual examination execution device 631 and the memory card 632 are separately stored until the start of examination. The reproduction permission key 633 is stored in the memory card 632 that is held by the examiner until the start of examination, and the reproduction permission key 633 is information with which the reproduction permission judgment means 612 permits reproduction of questions, and it is stored in the memory card 632.

The examiner distributes the memory cards 632 in which the reproduction permission keys 633 are stored to the respective examinees immediately before the start of examination, and each examinee inserts the memory card 632 into the individual examination execution device 631 to start examination. When the play button 606 is pressed, the reproduction permission judgment means 612 notifies the question selection means 604 as to whether reproduction of questions should be permitted or not in the individual examination execution device 621 whose play button 606 is pressed. Whether reproduction of questions should be permitted or not in the individual examination execution device 631 whose play button 606 is pressed is judged by that the reproduction permission judgment means 612 reads the information of the reproduction permission key 633 that is stored in the memory card 632. When the inserted memory card 632 is the memory card which is distributed by the examiner immediately before examination, reproduction of questions is permitted by the reproduction permission key 633 stored in the memory card 632. When reproduction of questions is permitted, the question selection means 604 that receives the question reproduction permission information selects one from among the plural examination questions stored in the question storage means 602 on the basis of the received information, and sends the selected examination question data to the audio reproduction means 605. The selected examination question data is converted into audio data by the audio reproduction means 605 and outputted as voice to the headphones 607.

On the other hand, when the inserted memory card 632 is not the memory card which is distributed by the examiner, since the reproduction permission key 633 is nonconforming, the question data stored in the question storage means 602 are not reproduced even when the play button 606 is pressed.

As described above, according to the third embodiment, even when the play button 606 is pressed, the questions are not reproduced if the inserted memory card is not the memory card 632 which is distributed by the examiner immediately before the start of examination and contains the reproduction permission key 633. Therefore, it is possible to avoid such a dishonest act that the questions are reproduced by the individual examination execution device 621 possessed by the third person by radio and the third person informs the correct answers to the examinee, and simultaneously, it is possible to reduce the trouble of connecting the devices with cables, and reduce the restrictions on the examination execution environment such as the cable length.

It is possible to easily realize the individual examination execution device 631 by using a semiconductor player as the device 631 and a memory card as the question storage means 602, respectively.

While in this third embodiment a semiconductor player is used as the individual examination execution device 631, the individual examination execution device 631 is not restricted thereto, and any device that can reproduce audio, such as a radio cassette player or a portable music player other than the semiconductor player, may be used. Further, while memory cards are used as the question storage means 602 and the media that stores the reproduction permission key 633, the question storage means 602 and the media that stores the reproduction permission key 633 are not restricted thereto, and any media that can store electron data, such as a hard disk or a mini disk, may be used.

Embodiment 4

Hereinafter, an individual examination execution device according to a fourth embodiment of the present invention will be described with reference to the drawings.

In the listening comprehension test using a single audio source in which voice is reproduced from a speaker placed in the examination room so that all the examinees in the examination room concurrently listen to the questions and answer the same, or the listening comprehension test using the individual examination execution devices each having only 1×-speed playback during audio reproduction, the examinees are not allowed to arbitrarily perform pace allocation for answers within the allowed range of examination execution time, in contrast to the paper test. The individual examination execution device according to the fourth embodiment resolves this problem.

Figure 4:
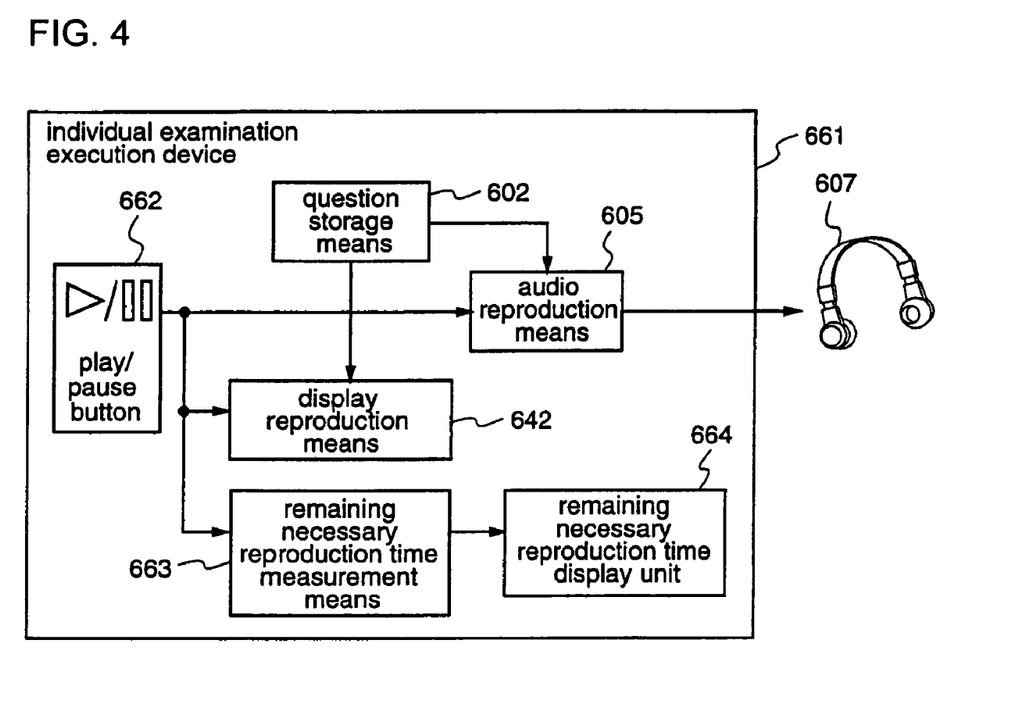
FIG. 4 is a block diagram of an individual examination execution device according to a fourth embodiment for explaining an examination method using the device.

FIG. 4 is a diagram illustrating the construction of the individual examination execution device according to the fourth embodiment.

In FIG. 4, reference numeral 661 denotes an individual examination execution device, 602 denotes a question storage means, 605 denotes an audio reproduction means, 642 denotes a display reproduction means, 663 denotes a remaining necessary reproduction time measurement means, 664 denotes a remaining necessary reproduction time display unit, 662 denotes a play/pause button, and 607 denotes headphones.

The individual examination execution device 661 includes the question storage means 602 in which examination questions are stored, the play/pause button 662 which is switched between playback and pause every time it is pressed, the audio reproduction means 605 which outputs the audio information in the examination questions from the question storage means 602 to the headphones 607 when the play/pause button 662 is pressed, the display reproduction means 642 which displays the visual information, the remaining necessary reproduction time measurement means 663 which measures the remaining time that is required for reproducing the examination questions, from the play/pause information that is obtained by pressing the play/pause button 662, and the remaining necessary reproduction time display unit 664 which display the remaining time that is required for reproducing the examination questions, which is given from the remaining necessary reproduction time measurement means 663.

Hereinafter, an examination method using the individual examination execution device 661 constructed as described above will be described.

When the play/pause button 662 of the individual examination execution device 661 is pressed, the examination question data stored in the question storage means 602 are read out. The examination question data stored in the question storage means 602 includes the audio information and the visual information, and the audio information in the read examination question data is sent to the audio reproduction means 605 and then outputted as voice to the headphones 607. Further, when performing a listening test in such a form that the examinee answers the questions while viewing the visual information such as pictures and diagrams, the visual information in the read examination question data is displayed on the display reproduction means 642, and the examinee takes the examination while viewing the display reproduction means 642. Further, the play/pause button 662 can repeat playback and pause according to the number of times it is pressed, and thereby the examinee can arbitrarily select playback and pause within the allowed range of the examination execution time. The information indicating the states of playback and pause is continuously transmitted to the remaining reproduction required time measurement means 663, and the time required for reproducing the remaining examination questions is calculated on the basis of the time required for reproducing the examination questions that have previously been stored, and the reproduction time that has elapsed up to the present time, and then informed to the remaining necessary reproduction time display unit 664, and thereby the remaining necessary reproduction time display unit 664 displays the time as visual information such as a numerical value or a graph.

As described above, according to the fourth embodiment, the examinee repeats reproduction of the questions and pause of the reproduction by pressing the play/pause button 662, and thereby the examinee can arbitrarily perform pace allocation of answers to the examination questions within the allowed range of the examination execution time. Simultaneously, the examinee can know the time required for reproducing the remaining questions by checking the remaining necessary reproduction time display unit 664, thereby preventing the examination from ending with un-reproduced questions remaining, which are not intended by the examinee.

The individual examination execution device 661 is easily realized by using a semiconductor player as the device 661, a memory card as the question storage means 602, a liquid crystal display as the display reproduction means 642, and a 7-segments LED as the remaining reproduction time display unit 664, respectively.

While in this fourth embodiment a semiconductor player is used as the individual examination execution device 661, the individual examination execution device 661 is not restricted thereto, and any device that can reproduce audio, such as a radio cassette player or a portable music player other than the semiconductor player, may be used. Further, while a memory card is used as the question storage means 602, the question storage means 602 is not restricted thereto, and any media that can store electron data, such as a hard disk or a mini disk, may be used. Further, while a liquid crystal display is used as the display reproduction means 642, the display reproduction means 642 is not restricted thereto, and any display device such as an organic EL display or a PDP (Plasma Display Panel) may be used. Further, while a 7-segments LED is used as the remaining necessary reproduction time display unit 664, the remaining necessary reproduction time display unit 664 is not restricted thereto, and any device may be used so long as it can provide visual information with which the examinee can confirm the time required for reproducing the remaining questions. Further, the remaining necessary reproduction time display unit 664 is not necessarily independent from other means in the individual examination execution device 661, and for example, it may be included in the display reproduction means 642. Furthermore, the play/pause button 662 is not necessarily a single button to be shared, a play button and a pause button may be separately provided so long as the examinee can arbitrarily select playback and pause.

Embodiment 5

Hereinafter, an individual examination execution device according to a fifth embodiment of the present invention will be described with reference to the drawings.

When the examinee freely selects playback of the examination questions and pause of the playback to perform pace allocation for answers, if the pause time increases, the reproduction time for the remaining examination questions relative to the remaining examination time becomes short, and thereby the examinee cannot reproduce the questions to the last. In addition, since pause is possible in the playback with the individual examination execution device 661 according to the fourth embodiment, the device 661 is useful for examinees who want to spend a lot of time for the listening questions while it is not suited to the examinees who want to complete the listening questions in short time and spend sufficient time for the questions other than the listening questions. The individual examination execution device according to the fifth embodiment resolves these problems.

Figure 5:
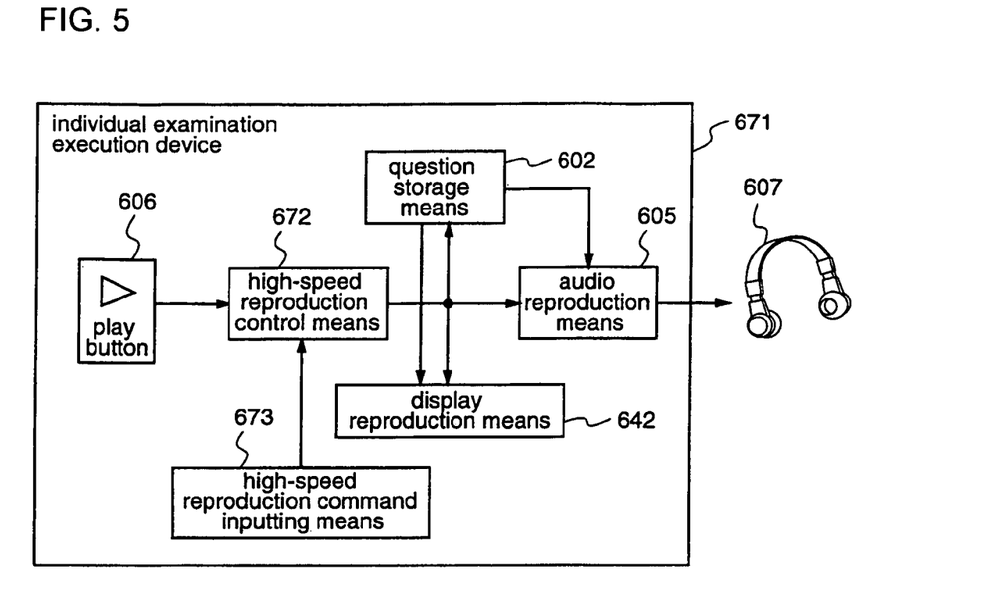
FIG. 5 is a block diagram of an individual examination execution device according to a fifth embodiment for explaining an examination method using the device.

FIG. 5 is a diagram illustrating the construction of the individual examination execution device according to the fifth embodiment of the present invention.

In FIG. 5, reference numeral 671 denotes an individual examination execution device, 602 denotes a question storage means, 605 denotes an audio reproduction means, 642 denotes a display reproduction means, 672 denotes a high-speed reproduction control means, 673 denotes a high-speed reproduction command inputting means, 606 denotes a play button, and 607 denotes headphones.

The individual examination execution device 671 includes the question storage means 602 which holds examination questions and is able to output examination question data at a speed corresponding to playback at an arbitrary speed equal to or higher than 1×, the high-speed reproduction command inputting means 673 for inputting speed setting information of 1× or higher, the high-speed reproduction control means 672 which outputs question reproduction control information of 1× or higher on the basis of the setting information obtained from the high-speed reproduction command inputting means 673, the audio reproduction means 605 corresponding to the playback at the arbitrary speed of 1× or higher, which outputs the audio information in the examination questions to the headphones 607, the display reproduction means 642 corresponding to the playback at the arbitrary speed of 1× or higher, which displays the visual information, and the play button 606.

Hereinafter, an examination method using the individual examination execution device 671 constructed as described above will be described.

When the play button 606 of the individual examination execution device 671 is pressed, the speed setting information of 1× or higher that is set by the high-speed reproduction command inputting means 673 is input to the high-speed reproduction control means 672. The high-speed reproduction control means 672 to which the speed setting information is inputted outputs question reproduction control information of 1× or higher to the question storage means 602, the audio reproduction means 605, and the display reproduction means 642 according to the speed setting information. The question storage means 602 can output the examination question data at a speed corresponding to playback at a speed of 1× or higher, and it outputs the examination execution data at the speed based on the reproduction control information supplied from the high-speed reproduction control means 672. The examination execution data stored in the question storage means 602 includes audio information and visual information, and the audio information in the read examination execution data is sent to the audio reproduction means 605. The audio reproduction means 605 corresponds to playback at an arbitrary speed of 1× or higher, and the audio information is outputted as voice to the headphones 607. Further, when performing a listening test in such a form that the examinee answers the questions while viewing the visual information such as pictures and diagrams, the visual information in the read examination question data is displayed on the display reproduction means 642 at a speed of 1× or higher that is synchronized with the audio reproduction means corresponding to playback at an arbitrary speed of 1× or higher.

As described above, according to the fifth embodiment, after the examinee presses the play button 606, the examinee sets an arbitrary speed of 1× or higher as needed by using the high-speed reproduction command inputting means 673 to reduce the question reproduction time, and thereby the examinee can arbitrarily perform pace allocation for answers to the examination questions within the allowed range of the examination execution time.

The individual examination execution device 671 can be easily realized by using a semiconductor player as the device 671, a memory card as the question storage means 602, and a liquid crystal display as the display reproduction means 642.

While in this fifth embodiment a semiconductor player is used as the individual examination execution device 671, the individual examination execution device 671 is not restricted thereto, and any device that can reproduce audio, such as a radio cassette player or a portable music player other than the semiconductor player, may be used. Further, while a memory card is used as the question storage means 602, the question storage means 602 is not restricted thereto, and any media in which electron data can be recorded, such as a hard disk or a mini disk, may be used. Further, while a liquid crystal display is used as the display reproduction means 642, the display reproduction means 642 is not restricted thereto, and any display device such as an organic EL display or a PDP (Plasma Display Panel) may be used.

Embodiment 6

Hereinafter, an individual examination execution device according to a sixth embodiment of the present invention will be described with reference to the drawings.

In the above-mentioned fifth embodiment, when the examinee arbitrarily selects a playback speed of 1× or more to perform pace allocation, since the playback speed is increased, the examinee cannot take time to think the questions by pausing the playback when answering the questions while the reproduction of questions is increased in speed, that is, the examinee cannot arbitrarily perform pace allocation for the reproduction of examination questions and the answering time during the listening test. The individual examination execution device according to the sixth embodiment has a means for resolving this problem.

Figure 6:
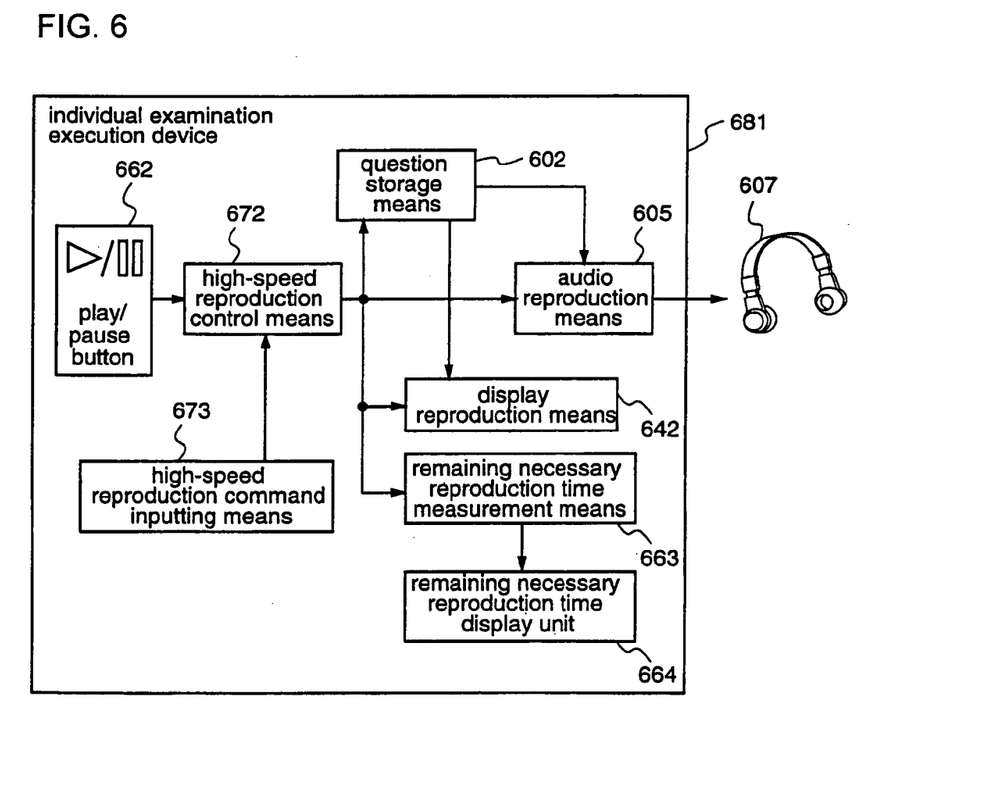
FIG. 6 is a block diagram of an individual examination execution device according to a sixth embodiment for explaining an examination method using the device.

FIG. 6 is a diagram illustrating the construction of the individual examination execution device according to a sixth embodiment.

In FIG. 6, reference numeral 681 denotes an individual examination execution device, 602 denotes a question storage means, 605 denotes an audio reproduction means, 642 denotes a display reproduction means, 672 denotes a high-speed reproduction control means, 673 denotes a high-speed reproduction command inputting means, 663 denotes a remaining necessary reproduction time measurement means, 664 denotes a remaining necessary reproduction time display unit, 662 denotes a play/pause button, and 607 denotes headphones.

The individual examination execution device 681 includes the question storage means 602 that holds examination questions, and is able to output the examination question data at a speed corresponding to playback at an arbitrary speed of 1× or more, the high-speed reproduction command inputting means 673 for inputting speed setting information of 1× or more, the high-speed reproduction control means 672 which outputs question playback control information of 1× or more on the basis of the setting information obtained from the high-speed reproduction command inputting means 673, the audio reproduction means 605 which outputs the audio information in the examination questions to the headphones 607, and corresponds to playback at an arbitrary speed of 1× or more, the display reproduction means 642 which displays the visual information, and corresponds to playback at an arbitrary speed of 1× or more, the play/pause button 662 which is switched between playback and pause every time the button is pressed, the remaining necessary reproduction time measuring means 663 which calculates the time required for reproducing the remaining questions at the current playback speed that is obtained from the high-speed reproduction control means 672, and the remaining necessary reproduction time display unit 664 which displays the remaining time that is required for reproducing the examination questions, which is given from the remaining necessary reproduction time measuring means 663.

Hereinafter, an examination method using the individual examination execution device 681 constructed as described above will be described.

The play/pause button 662 of the individual examination execution device 681 can repeat playback and pause depending on the number of times the button 662 is pressed, and the examinee can arbitrarily select playback and pause within the allowed range of the examination execution time. When this play/pause button 662 is pressed and thereby the device 681 is in the playback mode, the speed setting information of 1× or more which is set by the high-speed reproduction command inputting means 673 is inputted to the high-speed reproduction control means 672.

The high-speed reproduction control means 672 to which the speed setting information is inputted outputs question reproduction control information of 1× or more to the question storage means 602, the audio reproduction means 605, the display reproduction means 642, and the remaining necessary reproduction time measuring means 663, according to the speed setting information.

The question storage means 602 can output the examination question data at a speed corresponding to playback at a speed of 1× or more, and it outputs the examination question data at a speed based on the reproduction control information that is supplied from the high-speed reproduction control means 672. The examination question data stored in the question storage means 602 includes the audio information and the visual information, and the audio information in the read examination question data is sent to the audio reproduction means 605. The audio reproduction means 605 corresponds to playback at an arbitrary speed of 1× or more, and the audio information is outputted as voice to the headphones 607. Further, when performing a listening test in such a form that the examinee answers the questions while viewing visual information such as pictures and diagrams, the visual information included in the read examination question data is displayed on the display reproduction means 642 at a speed of 1× or more that is synchronized with the audio reproduction means corresponding to playback at an arbitrary speed of 1× or more.

Further, during the playback mode, the reproduction control information outputted from the high-speed reproduction control means 672 is continuously sent to the remaining required reproduction time measuring means 663, and the remaining necessary reproduction time measurement means 663 calculates the reproduction time that is required when the remaining questions are reproduced at the current reproduction speed setting, on the basis of the time required for 1×-speed reproduction of the examination questions that are previously stored, the elapsed time if the examination questions that have been reproduced up to the present time are reproduced at 1× speed, and the current reproduction speed setting information. The result of calculation is informed to the remaining necessary reproduction time display unit 664, and the remaining necessary reproduction time display unit 664 receiving the information displays the result as visual information such as a numerical value or a graph.

As described above, according to the sixth embodiment, the examinee repeats playback of questions and pause by pressing the play/pause button 662, and after setting the device in the playback mode, the examinee sets an arbitrary speed of 1× or more as desired using the high-speed reproduction command inputting means 673 to reduce the question reproduction time, whereby the examinee can arbitrarily perform pace allocation for the question reproduction time as well as the answering time within the allowed range of the examination execution time. In addition, the examinee can know the time required for reproducing the remaining questions by seeing the remaining necessary reproduction time display unit 664, thereby preventing the problem that the examination is ended with unreproduced questions being left, which are not intended by the examinee.

The individual examination execution device 681 can be easily realized by using a semiconductor player as the individual examination execution device 681, a memory card as the question storage means 602, a liquid crystal display as the display reproduction means 642, and a 7-segments LED as the remaining necessary reproduction time display unit 664, respectively.

While in this sixth embodiment a semiconductor player is used as the individual examination execution device 681, the individual examination execution device 681 is not restricted thereto, and any device that can reproduce audio, such as a radio cassette player or a portable music player other than the semiconductor player, may be used. Further, while a memory card is used as the question storage means 602, the question storage means 602 is not restricted thereto, and any media that can store electron data, such as a hard disk or a mini disk, may be used. Further, while a liquid crystal display is used as the display reproduction means 642, the display reproduction means 642 is not restricted thereto, and any display device such as an organic EL display or a PDP (Plasma Display Panel) may be used. Further, while a 7-segments LED is used as the remaining necessary reproduction time display unit 664, the remaining necessary reproduction time display unit 664 is not restricted thereto, and any device may be used so long as it can provide visual information with which the examinee can confirm the time required for reproducing the remaining questions. Further, the remaining reproduction time display unit 664 is not necessarily independent from other means in the individual examination execution device 681, and for example, it may be included in the display reproduction means 642. Furthermore, the play/pause button 662 is not necessarily a single button to be shared, a play button and a pause button may be separately provided so long as playback and pause can be arbitrarily selected.

Embodiment 7

Hereinafter, a seventh embodiment of the present invention will be described with reference to the drawings.

Conventionally, when connecting the examiner to the individual examination execution devices by cables, the individual examination execution device held by the examiner must be connected with those held by the respective examinees using cables, and thereby the examination execution environment is restricted by the cable lengths, or preparation for examination execution is troublesome. Further, when performing wireless connection, the following dishonest acts may occur. That is, a malicious examinee prepares a plurality of individual examination execution devices and gives them to a third party in advance, and the third party is present within the reach of radio wave to make contact with the examinee. In this case, since the individual examination execution device held by the third person can perform reproduction simultaneously outside the examination room, the third person can check the questions and inform correct answers to the examinee. The individual examination execution device according to the seventh embodiment resolves the above-mentioned problems.

Figure 7:
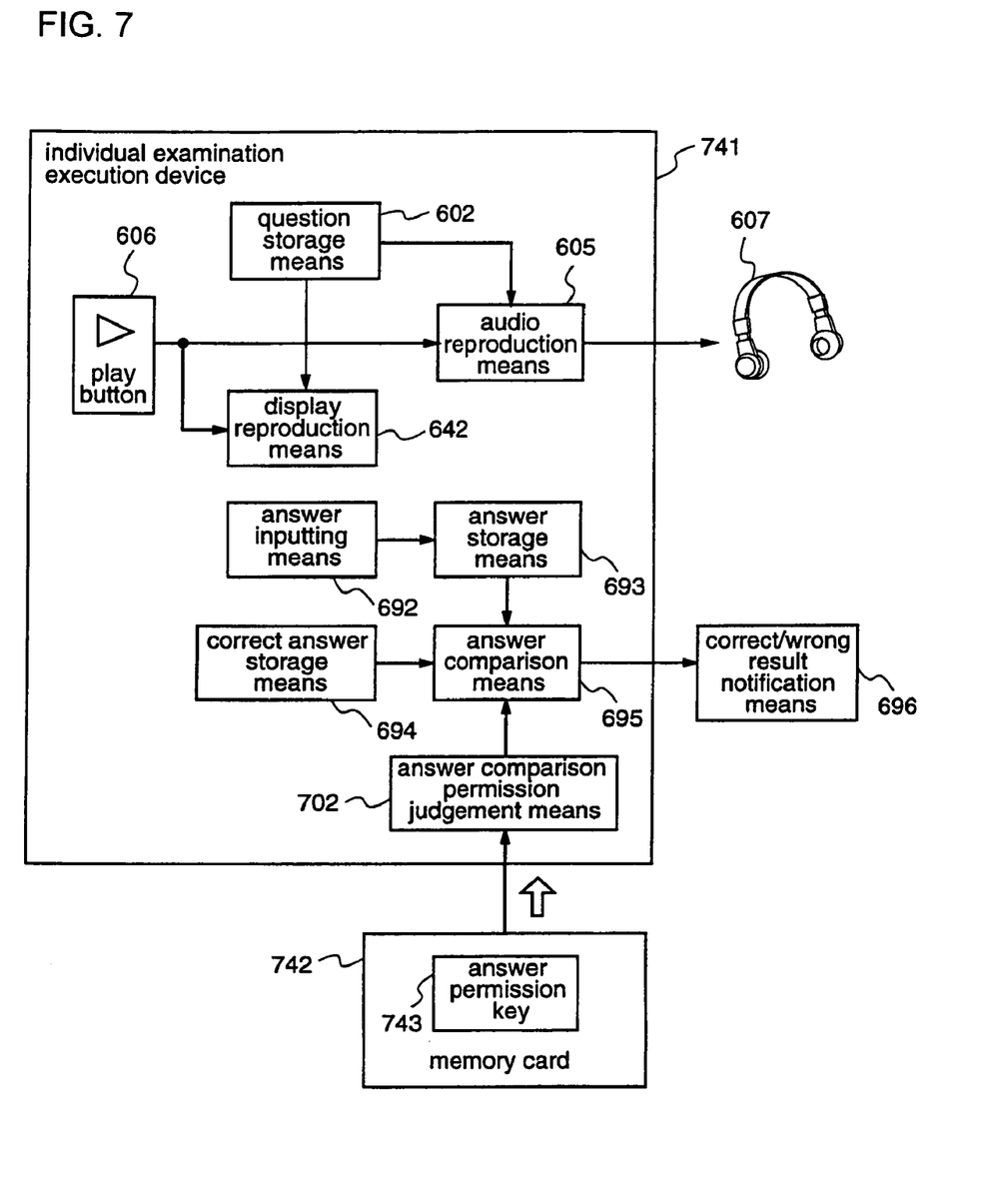
FIG. 7 is a block diagram of an individual examination execution device according to a seventh embodiment for explaining an examination method using the device.

FIG. 7 is a diagram illustrating the construction of the individual examination execution device according to the seventh embodiment.

In FIG. 7, reference numeral 741 denotes an individual examination execution device, 602 denotes a question storage means, 693 denotes an answer storage means, 694 denotes a correct answer storage means, and 696 denotes a correct/wrong result notification means. Further, reference numeral 603 denotes an audio reproduction means, 642 denotes a display reproduction means, 692 denotes an answer inputting means, 695 denotes an answer comparison means, 702 denotes an answer comparison permission judgment means, 742 denotes a memory card, 743 denotes an answer permission key, 606 denotes a play button, and 607 denotes headphones.

The individual examination execution device 741 includes the question storage means 602 which stores examination questions, the audio reproduction means 603 which outputs audio information included in the examination questions from the question storage means 602 to the headphones 607 when the play button 606 is pressed, the display reproduction means 642 which displays visual information, the answer inputting means 692 with which the examinee inputs answer numbers or marks, the answer storage means 693 which stores the answer numbers or marks that are inputted by the examinee using the answer inputting means 692, the correct answer storage means 694 which stores the correct answers of the examination questions stored in the question storage means 602, the answer comparison means 695 which compares the answers by the examinee with the correct answers, the answer permission key 743 which is answer comparison execution permission information to be given to the answer comparison permission judgment means 702, the memory card 742 which contains the answer permission key 743, the answer comparison permission judgment means 702 which judges whether execution of answer comparison by the answer comparison means 695 should be permitted or not, on the basis of the answer permission key 743 as the answer comparison execution permission information obtained from the memory card 742, and the correct/wrong result notification means 696 which notifies the correct/wrong information that is obtained by the answer comparison means 695.

Hereinafter, an examination method using the individual examination execution device 721 constituted as described above will be described.

When the play button 606 of the individual examination execution device 741 is pressed, the examination question data stored in the question storage means 602 are read out. The examination question data stored in the question storage means 602 include audio information and visual information, and the audio information in the read examination question data is sent to the audio reproduction means 605, and outputted as voice to the headphones 607. Further, when performing a listening test in such a form that the examinee answers the questions while viewing the visual information such as pictures and diagrams, the visual information in the read examination question data is displayed on the display reproduction means 642, and the examinee takes the examination while viewing the display reproduction means 642. Further, the examinee inputs, for each question, an answer number or mark by using the answer inputting means 692 on the basis of the audio information from the headphones 607 and the visual information from the display reproduction means 642. The answer number or mark information that is selected by the examinee is stored in the answer storage means 693.

After the examination is ended, the memory cards 742 that have been held by the examiner are distributed. The answer permission key 743 is stored in each memory card 742 that is held by the examiner by the end of examination, and the answer permission key 743 is information that permits the answer comparison permission judgment means 702 to execute answer comparison. Each examinee inserts the memory card 742 into his/her individual examination execution device 741. The answer permission key 743 stored in the memory card 742 that is inserted in the individual examination execution device 741 is transmitted to the answer comparison permission judgment means 702. On receipt of the answer permission key 743 as the permission information for executing answer comparison, the answer comparison permission judgment means 702 permits the answer comparison means 695 to execute answer comparison.

The answer comparison means 695 that is permitted to execute answer comparison compares the answers stored in the answer storage means 693 with the correct answers stored in the correct answer storage means 694, and outputs the correct/wrong results to the correct/wrong result notification means 696.

As described above, according to the seventh embodiment, when performing a listening test in such a form that the examinee answers the questions while viewing visual information such as pictures and diagrams, the examinee takes the examination while viewing the display reproduction means 642, and further, the answer inputting means 692 and the answer storage means 693 are included in the individual examination execution device 741. Therefore, question sheets having visual information such as pictures and diagrams as well as answer sheets are dispensed with, and the entirety of the listening comprehension test can be carried out by using only the individual examination execution device 741. As the result, the troubles of preparing and distributing question sheets and answer sheets can be reduced.

Further, the answers of each examinee are compared with the correct answers by the answer comparison means 695, and the results are stored in the correct/wrong result notification means 696. Therefore, the processes of collecting the answer sheets after the examination and reading the sheets with a machine to check the answers are dispensed with, whereby the time from collection of answers to notification of examination results to the examinees can be reduced relative to the answer sheet collection type examination.

Furthermore, since the memory cards 742 in which the answer permission keys 743 as the permission information for executing answer comparison are not distributed to the respective examinees but are held by the examiner by the end of examination, the examiner can arbitrarily control permission and non-permission of answer comparison execution until the examiner confirms the end of examination and distributes the memory cards 742, thereby preventing the dishonest act of executing answer comparison before the end of examination to obtain the correct answers. In addition, since it is only necessary for the examiner to distribute the stored memory cards after the end of examination, the conditions of the examination execution environments such as restriction by the cable lengths, the trouble of preparation, and the restriction on the reach of the radio wave are eased, thereby reducing preparation for examination execution.

The individual examination execution device 741 can be easily realized by using a semiconductor player for the device 741, memory cards for the question storage means 602, the answer storage means 693, the correct answer storage means 694, and the correct/wrong result notification means 696, and a liquid crystal display for the display reproduction means 642, respectively.

While in this seventh embodiment a semiconductor player is used as the individual examination execution device 741, the individual examination execution device 741 is not restricted thereto, and any device that can reproduce audio, such as a radio cassette player or a portable music player other than the semiconductor player, may be used. Further, while memory cards are used as the question storage means 602, the answer storage means 693, the correct answer storage means 694, and the correct/wrong result notification means 696, these means are not restricted to the memory cards, and any media that can store electron data, such as a hard disk or a mini disk, may be used. Further, while the memory cards are used as the question storage means 602, the answer storage means 693, the correct answer storage means 694, and the correct/wrong result notification means 696, respectively, it is not always necessary to prepare a memory card or a recordable medium for each means, and at least one memory card or medium will suffice for all the storage.

Further, while a liquid crystal display is used as the display reproduction means 642, the display reproduction means 642 is not restricted thereto, and any display device such as an organic EL display or a PDP (Plasma Display Panel) may be used.

Since an individual examination execution device according to the present invention is provided with an information recording/reproduction function that controls examination questions so as to be reproduced only in a predetermined period of time, it is possible to prevent dishonest acts such as reproduction of the examination questions outside the examination time. Further, since the individual examination execution device is provided with a function of holding the correct answers to the examination questions and comparing the correct answers with the answers by examinees, notification of the results to the respective examinees after the examination can be speedily carried out. Therefore, the individual examination execution device is extremely useful for reproduction of examination questions and the like.

The invention claimed is:

1. An individual examination execution device comprising:
an examination question storage means which stores examination questions;
a reproduction means for reproducing the examination questions that are read from the examination question storage means;
an answer inputting means for inputting answers;
an answer storage means which stores the answers inputted to the answer inputting means;
an unanswered question confirmation means for confirming information of unanswered examination questions with reference to an answer data group that is stored in the answer storage means;
a display means for displaying information relating to the unanswered examination questions that are confirmed by the unanswered question confirmation means; and
an automatic answering means for automatically answering the unanswered examination questions that are confirmed by the unanswered question confirmation means, the unanswered examination questions being automatically answered according to a procedure that has previously been specified by an examinee.

2. An individual examination execution method executed on an individual execution device,
wherein the individual execution device includes:
an examination question storage means which stores examination questions;
a reproduction means for reproducing the examination questions that are read from the examination question storage means;
an answer inputting means for inputting answers; and
an answer storage means which stores the answers inputted to the answer inputting means, and
wherein said individual examination execution method includes:
performing an individual examination on an examinee, wherein each examinee is individually presented with individually reproduces the examination questions stored in the examination question storage means;
an unanswered question confirmation step of confirming information of unanswered examination questions with reference to an answer data group that is stored in the answer storage means;
a display step of displaying information relating to the unanswered examination questions that are confirmed in the unanswered question confirmation step; and
an automatic answering step of automatically answering the unanswered examination questions that are confirmed in the unanswered question confirmation means, the unanswered examination questions being automatically answered according to a procedure that has previously been specified by the examinee.

* * * * *